United States Patent [19]

Wellner et al.

[11] 4,204,051
[45] May 20, 1980

[54] PROCESS FOR POLYURETHANES FROM ORTHO-ESTER-BLOCKED POLYOLS

[75] Inventors: Wolfgang Wellner, Cologne; Hermann Gruber, Leverkusen, both of Fed. Rep. of Germany

[73] Assignee: Bayer Aktiengesellschaft, Leverkusen, Fed. Rep. of Germany

[21] Appl. No.: 914,265

[22] Filed: Jun. 12, 1978

Related U.S. Application Data

[62] Division of Ser. No. 802,169, May 31, 1977, abandoned.

[30] Foreign Application Priority Data

Jun. 5, 1976 [DE] Fed. Rep. of Germany ....... 2625392

[51] Int. Cl.$^2$ .................. C08G 18/40; C08G 18/48; C07C 43/32
[52] U.S. Cl. ....................... 528/55; 521/121; 521/124; 521/127; 521/129; 521/174; 528/48; 528/53; 528/58; 528/73; 560/92; 560/199
[58] Field of Search .............. 252/182; 521/121, 127, 521/174; 528/58, 73, 55

[56] References Cited

U.S. PATENT DOCUMENTS

| 3,354,100 | 11/1967 | Kuryla ............... 260/615 A |
| 3,392,153 | 7/1968 | Hostettler ............ 521/127 |
| 3,892,685 | 7/1975 | Pusey ................. 521/121 |
| 3,975,381 | 8/1976 | Kondo ............... 260/615 A |
| 4,051,081 | 9/1977 | Jabs ................... 521/121 |

FOREIGN PATENT DOCUMENTS

184841 7/1966 U.S.S.R. ............... 260/615 A

*Primary Examiner*—H. S. Cockeram
*Attorney, Agent, or Firm*—Gene Harsh; Lawrence S. Pope

[57] ABSTRACT

This invention relates to a process for the preparation of new organic compounds having blocked hydroxyl groups, which compounds are converted by the action of moisture into compounds having free hydroxyl groups, the preferred compounds obtainable by this process, and a process for the preparation of polyurethanes in which mixtures containing polyisocyanates and compounds which can be converted into polyols by hydrolysis are reacted with water.

6 Claims, No Drawings

PROCESS FOR POLYURETHANES FROM ORTHO-ESTER-BLOCKED POLYOLS

This is a division of application Ser. No. 802,169 filed May 31, 1977, now abandoned.

BACKGROUND OF THE INVENTION

It is known that several fields of application are open for polyurethanes which can be prepared from polyols and polyisocyanates, but the reaction of the starting components generally proceeds so rapidly even at room temperature that the reaction mixtures (two-component systems) are quite unstable in storage even at room temperature. If one-component systems which are stable in storage are to be obtained, it is therefore necessary to eliminate the reactivity of the isocyanate groups and/or hydroxyl groups by reversible blocking.

One-component systems of this kind include, for example, the known mixtures of polyhydroxyl compounds and polyisocyanates having blocked isocyanate groups (see e.g. Polyurethanes, Chemistry and Technology, Part I, Interscience Publishers, 1962, page 8). Compounds containing blocked groups which are normally reactive with isocyanate groups are, for example, the oxazolidines described in German Offenlegungsschrift No. 2,446,438. Mixtures of polyisocyanates and these oxazolidines are stable in storage at room temperature and it is only when they are exposed to water (atmospheric moisture) that they release hydroxyl and amino groups and are converted into systems which react to form polyurethane ureas. The preparation of these urethane oxazolidines is carried out in a multistage reaction via the intermediate stage of the corresponding N-hydroxyalkyloxazolidines which are reacted with polyisocyanates to yield urethane oxazolidines. If desired, the polyisocyanates used in this reaction may be prepolymers with free isocyanate groups based on the usual polyhydroxyl compounds used in polyurethane chemistry. These prepolymers are known per se.

It is an object of the present invention to provide a simple process for reversibly blocking the usual polyhydroxyl compounds used in polyurethane chemistry. This problem could be solved by the invention described below. The present invention does not only provide a new method for the preparation of polyhydroxyl compounds with blocked hydroxyl groups but also permits to simultaneously reduce the viscosity of the starting polyhydroxyl compounds so that the products of the invention unless they are branched often exhibit a considerably lower viscosity than the starting polyhydroxyl compounds.

SUMMARY OF THE INVENTION

The present invention relates to a process for the preparation of organic compounds having blocked hydroxyl groups, which compounds are converted by moisture into polyhydroxyl compounds having free hydroxyl groups, in which one mol of a polyhydroxyl compound of the formula $$X(OH)_n$$

is reacted with at least about 0.5 n and preferably from about 0.5 n to 1 n mol of an orthocarboxylic acid ester, in which
n represents an integer of from 2 to 8 and
X represents a group which can be obtained by removal of the hydroxyl groups from an n-valent organic polyhydroxyl compound having a molecular weight within the range of about 90 to 10,000. Moreover, the hydroxyl groups of the polyhydroxyl compound $X(OH)_n$ are each separated from neighboring hydroxyl groups by at least three chain members.

The present invention also relates to the preferred compounds which can be obtained by this process, represented by the formula

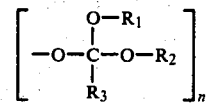

in which
X and n have the meanings specified above and
$R_1$ and $R_2$ may be the same or different and represent aliphatic hydrocarbon groups having from 1 to 6 carbon atoms and
$R_3$ represents hydrogen or a group which can be defined in the same terms as $R_1$ or $R_2$.

The above mentioned process according to the invention gives rise to organic compounds having end groups of the formula

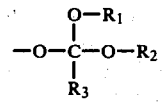

in which $R_1$, $R_2$ and $R_3$ preferably have the meaning already indicated above. Under the action of water (atmospheric moisture), these compounds which have blocked hydroxyl end groups split off low molecular weight $R_1$—OH and carboxylic acid esters $R_3$—$COOR_2$ and are converted into compounds having hydroxyl end groups. This means that mixtures containing compounds having the above mentioned end groups in addition to polyisocyanates are stable in storage so long as moisture is excluded, but react on access of moisture to form the corresponding polyurethanes by way of the intermediate formation of hydroxyl groups.

The present invention therefore also relates to a process for the preparation of polyurethanes by the reaction of water with mixtures containing polyisocyanates and organic compounds which, under the influence of moisture, form polyhydroxyl compounds which have free hydroxyl groups, characterized in that the compounds which under the influence of moisture give rise to polyhydroxyl compounds having free hydroxyl groups are compounds containing at least two groups of the formula

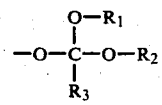

wherein $R_1$, $R_2$ and $R_3$ have the meanings specified above.

The polyols of the formula $$X(OH)_n$$

which are required to be blocked according to the invention have a molecular weight of from about 90 to 10,000, preferably about 150 to 5000. Any polyhydroxyl compound in which the hydroxyl groups are separated from each other by at least 3 and preferably at least 4 chain members may be used according to the invention. By "chain members" are meant mainly carbon and oxygen atoms situated between the individual hydroxyl groups.

DETAILED DESCRIPTION OF THE INVENTION

The following are examples of suitable polyhydroxyl compounds $X(OH)_n$: Neopentyl glycol; tetramethylene glycol; hexamethylene glycol; octamethylene glycol; 1,5-dihydroxyhexane; diethylene glycol; triethylene glycol; tetraethylene glycol; dipropylene glycol; tripropylene glycol; dibutylene glycol and tributylene glycol; also polyesters, polyethers, polythioethers, polyacetates, polycarbonates and polyester amides known per se in polyurethane chemistry, in particular those having from 2 to 8, preferably 2 to 4, hydroxyl groups. The low molecular weight polyols and the polyester polyols and polyether polyols are preferred.

Suitable polyesters with hydroxyl groups include, for example, the reaction products of polyhydric, preferably dihydric alcohols, to which trihydric alcohols may be added, and polybasic, preferably dibasic carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: Succinic acid, adipic acid, suberic acid, azelaic acid, sebacic acid, phthalic acid, isophthalic acid, trimellitic acid, collodine dicarboxylic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid anhydride, fumaric acid, dimeric and trimeric fatty acids such as oleic acid which may be used as mixtures with monomeric fatty acids, dimethylterephthalate and terephthalic acid-bis-glycol esters. Suitable polyhydric alcohols for the preparation of the polyesters include e.g. ethylene glycol, propylene glycol-(1,2) and -(1,3), butylene glycol-(1,4) and -(2,3), hexanediol-(1,6), octanediol-(1,8), neopentyl glycol, cyclohexane dimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycol, dipropylene glycol, polypropylene glycols, dibutylene glycol, and polybutylene glycols. Polyesters of lactones such as ε-caprolactone or hydroxycarboxylic acids such as ω-hydroxycaproic acid may also be used.

The hydroxyl polyethers used according to the invention, which have at least two, generally from two to eight and preferably two to three hydroxyl groups, are also known per se and are prepared, for example, by the polymerization of epoxides such as ethylene oxide, propylene oxide, butylene oxide, tetrahydrofuran, styrene oxide or epichlorohydrin, either on their own, e.g. in the presence of boron trifluoride, or by addition of these epoxides, either as mixtures or successively, to starting components having reactive hydrogen atoms, such as alcohols, phenols or amines, e.g. water, ethylene glycol, propylene glycol-(1,3) or -(1,2), trimethylolpropane, 1,4-dihydroxybenzene, 4,4'-dihydroxydiphenylpropane, aniline, ammonia, ethanolamine or ethylene diamine. Sucrose polyethers such as those described, for example, in German Auslegeschrift Nos. 1,176,358 and 1,064,938 may also be used according to the invention. It is frequently preferred to use polyethers which contain predominantly primary hydroxyl groups (up to 90% by weight, based on all the hydroxyl groups present in the polyether). Polyethers modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Patent Specification No. 1,152,536) are also suitable, as well as polybutadiene having hydroxyl groups.

Suitable polyacetals include e.g. the compounds which can be prepared from glycols such as diethylene glycol, triethylene glycol, 4,4'-dioxethoxy-diphenyl-dimethylmethane, hexanediol and formaldehyde. Suitable polyacetals for the purpose of the invention may also be prepared by the polymerization of cyclic acetals.

Suitable polycarbonates with hydroxyl groups include those known per se, e.g. those prepared by the reaction of diols such as propanediol-(1,3), butanediol-(1,4) and/or hexanediol-(1,6), diethylene glycol, triethylene glycol or tetraethylene glycol with diarylcarbonates, e.g. diphenyl carbonate or phosgene.

Suitable polyester amides include e.g. the predominantly linear condensates obtained from polybasic saturated and unsaturated carboxylic acids or their anhydrides and polyvalent saturated and unsaturated amino alcohols.

The process of blocking the above mentioned polyhydroxyl compounds in accordance with the invention is extremely simple. All that is required is to heat the polyhydroxyl compound with an ortho-carboxylic acid ester to temperatures of about 80° to 200° C., preferably about 100° to 150° C.

Suitable ortho-carboxylic acid esters are, for example, those of the following formula

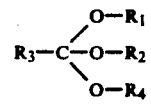

in which

R₁, R₂ and R₃ have the meanings already specified and

R₄ has the meaning of R₁ or R₂.

Examples of suitable ortho-carboxylic acid esters include orthoformic acid trimethyl ester, orthoformic acid triethyl ester, orthoformic acid tributyl ester, orthoformic acid trihexyl ester, orthoacetic acid trimethyl ester, orthoacetic acid triethyl ester, orthoacetic acid tributyl ester and orthohexane carboxylic acid trimethyl ester. Orthoformic acid triethyl ester is preferred.

The proportions in which the reactants are used are generally chosen so that the reaction mixture contains at least about 0.5 molecule of ortho-carboxylic acid ester preferably about 0.5 to 1 for each hydroxyl group of the polyhydroxyl compound which is required to be blocked. One way, of course, use an excess of ortho-carboxylic acid ester, which may be removed by distillation after the reaction according to the invention.

In the blocking reaction according to the invention, alcohol R$_4$-OH is split off and compounds containing the following group as an end group

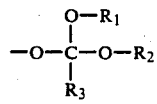

are invariably formed. However, and particularly when subequivalent quantities of ortho-carboxylic acid ester are used, a chain lengthening or cross-linking reaction takes place at the same time to form linkages represented by the formulae

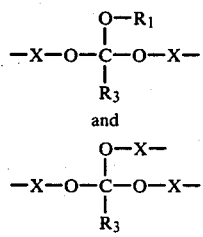

R$_2$—OH and possibly R$_1$—OH being split off at the same time.

It is therefore preferred to use the reactants in equivalent proportions in order to avoid formation of excessively highly cross-linked products, particularly when higher functional polyols X(OH)$_n$ are used. In this preferred variation of using equivalent quantities of reactants, compounds of the following formula

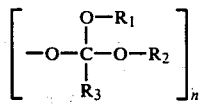

are preferentially formed. In these formulae, X, R$_1$, R$_2$, R$_3$ and n have the meaning already indicated.

The blocking reaction according to the invention may be carried out in the presence of suitable inert solvents but it is preferably carried out solvent-free. The by-products (low molecular weight alcohols) split off in the blocking reaction according to the invention are removed from the reaction mixture by distillation. The progress of the blocking reaction can be followed by quantitative determination of the by-products distilled off.

Not only the end groups of the following formula

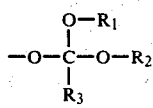

which are invariably present in the blocked polyols but also the linkage and cross-linking points represented by the formulae

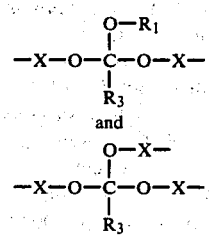

are very probably split off by action of moisture into the corresponding compounds which have free hydroxyl groups. In any case, it was found that mixtures of polyisocyanates with blocked compounds according to the invention having the last three groups shown above were stable in storage under the exclusion of moisture but reacted, on access of moisture, to form polyurethanes.

Consequently, in the process according to the invention for the preparation of polyurethanes, the compounds which have been blocked according to the invention are mixed with polyisocyanates, to which the usual auxiliary agents and additives used in polyurethane chemistry may be added, in addition to catalysts which accelerate hydrolysis of the orthoester groups.

In the process according to the invention for the preparation of polyurethanes, the nature and quantity of reactants are chosen so that the molar ratio of isocyanate groups to the total quantity of alcoholic hydroxyl groups present after hydrolysis of the blocked compounds is between about 0.8:1 and 2:1, preferably between about 1:1 and 1.6:1. In addition, it is necessary to take into account the fact that monohydric alcohols, that is to say alcohols which act as chain breaking agents, are split off during this hydrolysis. This means that it is preferred to use trifunctional and higher functional polyisocyanates for preparing polyurethanes by the process according to the invention, in order to compensate for the chain breaking action of the monohydric alcohols released by hydrolysis. Complete compensation is not necessary, in particular when an isocyanate excess is employed, since in the presence of an isocyanate excess other cross-linking reactions via allophanate groups can take place in addition to the NCO/OH reaction. It can easily be seen that complete compensation for the chain breaking action of the released monohydric alcohols by the NCO/OH reactions alone would only be possible if at least tetrafunctional polyisocyanates were used. In fact, it was found that triisocyanates were sufficient for the purpose if a suitable excess of isocyanate (NCO/OH ratio about 1.5) was used. For the reason explained above, it is less preferred to use diisocyanates although even diisocyanates used in sufficient excess could compensate for the chain breaking effect of the released monohydric alcohols by secondary cross-linking reactions via allophanate groups.

The polyisocyanates used for the process according to the invention may be aliphatic, cycloaliphatic, araliphatic, aromatic or heterocyclic polyisocyanates of the kind described e.g. by Siefgen in Justus Liebigs Annalen der Chemie, 562, pages 75 and 136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixture of these isomers; 1-isocyanato-3,5,5-trimethyl-5-isocyanatomethylcyclohaxane (German Auslegeschrift No. 1,202,785); hexahydrotolylene-2,4- and -2,6-diisocyanate and any mixtures of these isomers; hexahydrophenylene-1,3- and/or 1,4-diisocyanate; perhydrodiphenylmethane-2,4'- and/or 4,4'-diisocyanate; phenylene-1,3- and -1,4-diisocyanate; tolylene-2,4- and -2,6-diisocyanate and any mixtures of these isomers; diphenylmethane -2,4'- and/or 4,4'-diisocyanate; naphthylene-1,5-diisocyanate, triphenylmethane-4,4,4"-triisocyanate; polyphenyl-polymethylene polyisocyanates which can be obtained by aniline-formaldehyde condensation followed by phosgenation and which have been described, for example, in British Patent Specification Nos. 874,430 and 848,671; perchlorinated arylpolyisocyanates as described e.g. in German Auslegeschrift No. 1,157,601; polyisocyanates with carbodiimide groups as described in German Patent Specification No. 1,092,007 the diisocyanate described in U.S. Pat. No. 3,492,330; polyisocyanates with allophanate groups as described e.g. in British Patent Specification No. 994,890, Belgian Patent Specification No. 761,626 and published Dutch Patent Application No. 7,102,524; polyisocyanates with isocyanurate groups as described e.g. in German Patent Specifications Nos. 1,022,789; 1,222,067 and 1,027,394 and German Offenlegungsschriften Nos. 1,929,034 and 2,004,048; polyisocyanates with urethane groups as described e.g. in Belgian Patent Specification No. 752,261 or U.S. Pat. No. 3,394,164; polyisocyanates with acylated urea groups according to German Patent Specification No. 1,230,778; polyisocyanates with biuret groups as described e.g. in German Patent Specification No. 889,050, French Patent Specification No. 7,017,514 and U.S. Pat. No. 3,124,605, polyisocyanates prepared by telomerization reactions as described e.g. in Belgian Patent Specification No. 723,640; polyisocyanates with ester groups, e.g. those mentioned in British Patent Specifications No. 956,474 and No. 1,072,956; U.S. Pat. No. 3,567,763 and German Patent Specification No. 1,231,688, and reaction products of the above mentioned isocyanates with acetals according to German Patent Specification No. 1,072,385.

The distillation residues obtained from the commercial production of isocyanates and still containing isocyanate groups may also be used, and may be dissolved in one or more of the above mentioned polyisocyanates. Any mixtures of the above mentioned polyisocyanates may be used.

Apart from the trifunctional and higher functional representatives of the above mentioned polyisocyanates, it is particularly preferred to use the prepolymers known in polyurethane chemistry, which have free isocyanate groups, e.g. the compounds obtained by the reaction of preferably at least trifunctional polyhydroxyl compounds with excess quantities of diisocyanates of the kind mentioned above. The polyhydroxyl compounds from which these isocyanate prepolymers are obtained may be either low molecular weight polyols such as trimethylolpropane or higher molecular weight polyester or polyether polyols of the kind already mentioned above.

The reaction between the polyols which have been blocked according to the invention and the isocyanate component takes place after the action of water, e.g. atmospheric moisture, on mixtures containing the two components. It is surprisingly found that hydrolysis of the blocked polyols and their subsequent reaction with the isocyanate groups of the polyisocyanate component evidently proceeds more rapidly than the direct reaction between isocyanate groups and water.

This can be seen from the small quantity of components which can be extracted from the polyurethanes. From this it can be concluded that the polyols are built into the polyurethanes finally obtained whereas if the isocyanate groups reacted directly with water, the polyols would not be chemically fixed and could therefore be extracted.

Hydrolytic decomposition of polyols which have been blocked according to the invention may be accelerated by the addition of acid catalysts such as p-toluene sulphonic acid or phosphoric acid. In addition to these catalysts, the mixtures used for preparing the polyurethanes in accordance with the invention may contain the usual auxiliary agents and additives used in polyurethane chemistry. These include catalysts for accelerating the NCO/OH reaction, e.g. tertiary amines such as triethylamine, tributylamine, N-methylmorpholine, N-ethyl-morpholine, tetramethyl-ethylenediamine, 1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butane-diamine, N,N-dimethyl-β-phenylethylamine, 1,2-dimethylimidazole or 2-methylimidazole.

Silaamines having carbon-silicon bonds such as the compounds described e.g. in German Patent Specification No. 1,229,290 may also be used as catalysts, for example, 2,2,4-trimethyl-2-silamorpholine or 1,3-diethyl-aminomethyltetramethyl-disiloxane.

Basic nitrogen compounds such as tetraalkylammonium hydroxides, alkali metal hydroxide such as sodium hydroxide, alkali metal phenolates such as sodium phenolate and alkali metal alcoholates such as sodium methylate may also be used as catalysts. Hexahydrotriazines are also suitable catalysts.

Organic metal compounds may be used as catalysts according to the invention, in particular organic tin, zinc and lead compounds.

The organic tin compounds used are preferably tin-(II) salts of carboxylic acids such as tin(II) acetate, tin(II) octoate, tin(II) ethyl hexoate and tin(II) laurate and the dialkyl tin salts of carboxylic acids such as dibutyl tin diacetate, dibutyl tin dilaurate, dibutyl tin maleate or dioctyl tin diacetate.

It is particularly advantageous to use combinations of acid catalysts which accelerate catalytic decomposition of the blocked polyols and organometallic catalysts of the kind mentioned as examples for accelerating the NCO/OH reaction. The total quantity of catalysts used is generally between about 0.001 and 10% by weight, based on the reaction mixture.

Surface active additives may also be used according to the invention. Suitable emulsifiers include, e.g. the sodium salts of ricinoleic sulphonates or of fatty acids or salts of fatty acids with amines such as oleic acid diethylamine or stearic acid diethylanolamine. Alkali metal or ammonium salts of sulphonic acids, for example of dodecylbenzene sulphonic acids or dinaphthyl methane disulphonic acid, or of fatty acids such as ricinoleic acid or of polymeric fatty acids may also be used as surface active additives.

Reaction retarders may also be used according to the invention, e.g. compounds which are acid in reaction such as hydrochloric acid or organic acid halides, as well as pigments, dyes, flame retarding agents known per se such as tris-chloroethylphosphate or ammonium phosphate and polyphosphate, stabilizers against ageing and weathering, plasticizers, fungistatic and bacteriostatic substances, fillers such as barium sulphate, kieselguhr, carbon black or whiting.

Other examples of additives which may be used according to the invention, such as surface active additives, reaction retarders, stabilizers, flame retarding substances, plasticizers, dyes, fillers and fungistatic and bacteriostatic substances and details concerning their use and action may be found in Kunststoff-Handbuch, Volume VI, published by Vieweg and Hochtlen, Carl-Hanser-Verlag, Munich, 1966, e.g. on pages 103 to 113 and Polyurethanes: Chemistry and Technology, Volumes I and II, published by Interscience, 1964.

The process according to the invention for preparation of polyurethanes may be carried out in the presence of solvents. Suitable solvents include e.g. the usual lacquer solvents such as ethyl acetate, butyl acetate, methyl ethyl ketone, methyl isobutyl ketone, toluene or xylene or mixtures of these solvents.

The low molecular weight ester formed as a result of the hydrolytic decomposition according to the invention of the polyols which have been blocked according to the invention also has the action of a solvent which evaporates during and/or after chemical curing of the mixtures used in the process according to the invention for preparing the polyurethanes.

The process according to the invention for the preparation of polyurethanes may be employed in particular for the production of films, lacquers, coatings, sealing compounds, impregnating agents or adhesives for natural or synthetic substrates. Both permanent and removable coatings or films can be applied from the composition with or without solvent to any suitable substrate such as metal, glass, wood, synthetic resin, paper or leather, to which bonding agents such as silanes may be added.

The invention is explained in more detail in the following Examples describing the blocked polyols, processes for their preparation and combination of the blocked polyols with polyisocyanates.

EXAMPLES

Example 1

Reaction of triethylene glycol with orthoformic acid triethyl ester. Molar ratio: 1:2.

100 g of triethylene glycol and 200 g of orthoformic acid triethylester are introduced into a flask equipped with devices for stirring, adding reaction component and heating and a distillation apparatus. After heating, a distillate boiling within the range of 80° to 82° C. distills off at about 110° C. Towards the end of the reaction, the reaction temperature is briefly raised to about 150° C. and a total of about 60 g of distillate is obtained. The reaction is completed after a total of one hour. The blocked diol is obtained as a liquid, light-colored distillation residue.

Viscosity of diol at 20° C.: about 50 mPa.s
Viscosity of reaction product at 20° C.: about 10 mPa.s
Composition of distillate:
 Ethanol: about 90%
 Triethylorthoformate: about 6.5%
 Ethyl formate: about 3%
 unknown substances: about 0.5%.

EXAMPLE 2

Reaction of triethyleneglycol with orthoformic acid triethylester. Molar ratio 1:1.8.
Method of preparation as in Example 1.
Reaction mixture: 100 g of triethylene glycol and 180 g of triethylorthoformate
Quantity of distillate: about 60 g.

Example 3

Reaction of triethylene glycol with triethylorthoformate. Molar ratio 1:1.
Method of preparation as in Example 1.
Reaction mixture:
 150 g of triethylene glycol and
 150 g of triethyl orthoformate
Quantity of distillate: about 85 g
Viscosity of the product at 20° C.: about 845 mPa.s.

Example 4

Reaction of a linear polyether polyol based on propylene oxide and having a molecular weight of about 2000 and a hydroxyl content of 1.7% with triethyl orthoformate. Molar ratio 1:2.
Method of preparation as in Example 1.
Reaction mixture: 1000 g of polyol and 150 g of triethyl orthoformate.
Quantity of distillate: about 30 g
Viscosity at 20° C. of polyol used as starting material: 340 mPa.s
Viscosity at 20° C. of end product: 310 mPa.s

Example 5

Reaction of a linear polyester polyol based on adipic acid and diethylene glycol and having a hydroxyl content of about 1.7% with triethyl orthoformate. Molar ratio: 1:2.
Method of preparation as in Example 1.
Reaction mixture: 300 g of polyol and 45 g of triethyl orthoformate.
Quantity of distillate: About 10 g.
Viscosity at 20° C. of polyol used as starting material: about 12000 mPa.s
Viscosity at 20° C. of reaction product: about 19000 mPa.s.

Example 6

Reaction of a tetrafunctional polyether polyol (propoxylated pentaerythritol) having a hydroxyl content of 11.2% with triethyl orthoformate. Molar ratio: 1:4.
Reaction mixture: about 150 g of polyol and 150 g of triethyl orthoformate.
Method of preparation analogous to Example 1.
Quantity of distillate: about 41 g.
The mixture is heated to 123° C. within 20 minutes. Ethanol distills over at 80° C. and the temperature of the reaction mixture finally rises to about 145° C.
Reaction time about one hour.
Viscosity at 20° C. of polyol used as starting material: about 1100 mPa.s
Viscosity at 20° C. of reaction product: about 120 mPa.s.

Example 7

Reaction of 1,4-bis-(2-hydroxyethoxy)-benzene with triethyl orthoformate. Molar ratio: 1:2.
Reaction mixture: about 100 g of 1,4-bis-(2-hydroxyethoxy)benzene and 150 g of trimethyl orthoformate.

Method of preparation analogous to Example 1.
Quantity of distillate: about 47 g.

The suspension is slowly heated. A homogeneous solution is obtained at about 83° C. Ethanol distills over at about 103° C. The temperature of the reaction mixture finally rises to about 145° C. Reaction time about 1 hour.

Viscosity of the reaction product at 20° C.: about 70 mPa.s.

EXAMPLE 8

Reaction of triethylene glycol with trimethyl orthoformate. Molar ratio: 1:1.8.

Reaction mixture: 100 g of triethyleneglycol and 127.5 g of trimethyl orthoformate.

The preparation cannot be carried out by the same method as used in Example 1 because the reaction is then incomplete. The following, for example, is a successful modification of the method of preparation. The mixture is heated to about 110° C. within 20 minutes. It is then kept under reflux for a further 2 hours. A distillate boiling in the range of about 65° to 70° C. is subsequently obtained. Quantity of distillate: about 40 g.

Viscosity of reaction product at 20° C.: about 10 mPa.s.

EXAMPLE 9

100 g of blocked polyol according to Example 2,
0.6 g of dibutyl tin dilaurate,
0.12 g of p-toluene sulphonic acid,
470 g of a solution of a polyisocyanate having isocyanurate groups and prepared by catalytic trimerization of a mixture of 3 mol of 2,4-diisocyanatotoluene and 2 mol of hexamethylene diisocyanate; average isocyanate functionality=4; 60% solution in butyl acetate; isocyanate content of the solution =10.5%.

The mixture is stored for 5 days and then used to coat glass plates and steel plates to form a film having a thickness of 150 μm when wet. At room temperature and a relative humidity of 50%, the coatings are dust-dry after 15 minutes and harden to form a clear film free from bubbles.

Pendulum hardness according to DIN 53 157: 156 s after 1 day
Erichsen cupping according to DIN 53 156: 0.5 mm after 1 day.

Proportion which can be extracted from the resulting films with ether: about 0.3%.

Example 10

100 g of blocked polyol according to Example 5,
0.2 g of dibutyl tin dilaurate,
0.04 g of p-toluenesulphonic acid,
100 g of the polyisocyanate solution from Example 9.

The mixture is stored for 5 days and then used to coat glass plates and steel plates to form films having a thickness of 150 μm when wet. At room temperature and a relative humidity of 50%, the coatings are dust dry after 3½ hours and harden to form a clear film free from bubbles.

| Properties of the film after: | 1 day | 12 days |
|---|---|---|
| Pendulum hardness according to DIN 53 157: | 35 s | 55 |
| Erichsen cupping according to DIN 53 156: | 9.6 mm (metal plate cracks) | 8.0 |

Proportion which can be extracted from resulting films with ether: about 6%.

Example 11

100.0 g of blocked polyol according to Example 2,
5.0 g of dibutyl tin dilaurate
1.0 g of phosphoric acid,
1700.0 g of a branched higher molecular weight polyisocyanate prepared from polypropylene oxide-polyether polyol and 2,4-diisocyanatotoluene: isocyanate content: =3.5%, viscosity at 20° C. about 8000 mPa.s.

At room temperature and a relative humidity of 50%, thick films harden free from bubbles within four days. The above mixture is stable in storage at 50° C. for over one month.

Example 12

100 g blocked polyol according to Example 7,
470 g of the polyisocyanate solution according to Example 9.

Films prepared from the mixture which is stable in storage are dust dry after 10 minutes at room temperature and a relative humidity of 50% and harden to form clear films free from bubbles.

Example 13

100.00 g of blocked polyol according to Example 6,
190.00 g of a 75% solution in ethyl acetate of a reaction product of 3 mol of 2,4-diisocyanatotoluene and 1 mol of trimethylolpropane,
0.20 g of dibutyl tin dilaurate
0.04 g of p-toluenesulphonic acid.

Films prepared from the mixture which is stable in storage harden at room temperature and a relative humidity of 50% to form clear films free from bubbles.

Example 14

100.0 g of blocked polyol according to Example 7,
0.5 g of dibutyl tin dilaurate
0.1 g of p-toluenesulphonic acid,
190.0 g of the biuret polyisocyanate prepared from 3 mol of hexamethylenediisocyanate and 1 mol of water; isocyanate content 22%, average isocyanate functionality 3.

Coatings prepared from the mixture which is stable in storage are dust dry after about 5 hours at room temperature and a relative humidity of 50%.

Example 15

(Preparation of a sealing compound)
10.0 g of blocked polyol according to Example 6,
95.0 g of the polyisocyanate from Example 11,
105.0 g of alkylsulphonic acid ester ($C_{15}H_{31}$—$SO_3$—$C_6H_5$),
1.0 g of lead octoate (24% Pb),
0.2 g of p-toluenesulphonic acid,
12.0 g of highly dispersed silicate,
40.0 g of polyvinyl chloride powder,
5.0 g of titanium dioxide,
0.2 g of carbon black and
5.0 g of zeolite powder (molecular sieve).

The sealing compound indicated above, which is stable in storage, hardens at the rate of about 1 mm per day when kept at room temperature and a relative humidity of 50%. Shore A hardness of the material: 20.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of polyurethanes by the reaction of water and moisture free storage stable mixtures containing polyisocyanates and organic compounds which under the influence of moisture form polyhydroxyl compounds having free hydroxyl groups, characterized in that said organic compounds have at least two groups of the formula

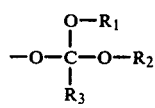

wherein $R_1$ and $R_2$ are the same or different and represent aliphatic hydrocarbon groups having from 1 to 6 carbon atoms, and $R_3$ represents hydrogen or a group which has the same meaning as defined for $R_1$ or $R_2$.

2. A moisture free storage stable composition comprising
   (a) compounds of the formula

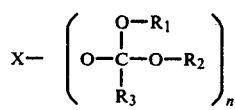

wherein X is the n-valent hydroxyl free residue of an organic polyhydroxyl compound which has a molecular weight of between about 90 and 10,000, $R_1$, $R_2$ and $R_3$ are the same or different and represent $C_1$ to $C_6$ aliphatic hydrocarbon groups, and $R_3$ may also represent hydrogen, and n is an integer of from 2 to 8 inclusive, and
   (b) polyisocyanates selected from the group consisting of aliphatic, cycloaliphatic, araliphatic, aromatic and heterocyclic isocyanates, prepolymers of said isocyanates with low molecular weight monomeric polyols, prepolymers of said isocyanates with higher molecular weight polyesters and prepolymers of said isocyanates with higher molecular weight polyethers.

3. A process for the synthesis of polyurethanes comprising reacting
   (a) A moisture free storage stable composition comprising
      (i) Compounds of the formula

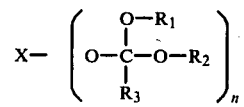

wherein X, $R_1$, $R_2$, $R_3$ and n are as defined in claim 2, and
      (ii) polyisocyanates selected from the group consisting of aliphatic, cycloaliphatic, araliphatic, aromatic and heterocyclic isocyanates, prepolymers of said isocyanates with low molecular weight monomeric polyols, prepolymers of said isocyanates with higher molecular weight polyesters and prepolymers of said isocyanates with higher molecular weight polyethers with
   (b) sufficient moisture to hydrolize the

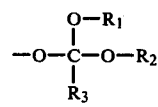

end groups of said compounds.

4. The process of claim 3 wherein an effective amount of an acid catalyst is used to promote the hydrolysis of said end groups.

5. The process of claim 4 wherein an organo metallic catalyst is used to promote the NCO/OH reaction and the total amount of both types of catalyst is between about 0.001 and 10 wt. %, based on the reaction mixture.

6. The composition of claim 2 wherein X is the n-valent hydroxyl free residue of an organic polyhydroxyl compound which is selected from the group consisting of low molecular weight monomeric polyols, polyester polyols and polyether polyols wherein each hydroxyl group of said compound is separated from any other by at least 3 chain members.

* * * * *